US008271343B2

(12) United States Patent
Schorr et al.

(10) Patent No.: US 8,271,343 B2
(45) Date of Patent: Sep. 18, 2012

(54) SYSTEMS AND METHODS FOR ELECTRONIC GIFTING

(76) Inventors: Ronni E. Schorr, Princeton Junction, NJ (US); Adam D. Dworsky, Princeton Junction, NJ (US)

( * ) Notice: Subject to any disclaimer, the term of this patent is extended or adjusted under 35 U.S.C. 154(b) by 1188 days.

(21) Appl. No.: 12/014,824

(22) Filed: Jan. 16, 2008

(65) Prior Publication Data
US 2008/0172306 A1 Jul. 17, 2008

Related U.S. Application Data

(60) Provisional application No. 60/880,772, filed on Jan. 16, 2007.

(51) Int. Cl.
*G06Q 30/00* (2006.01)
(52) U.S. Cl. .............. 705/26.1; 705/27.1; 705/26.82; 705/14.4
(58) Field of Classification Search ............ 705/26, 705/27, 26.1, 27.1, 26.82, 14.4
See application file for complete search history.

(56) References Cited

U.S. PATENT DOCUMENTS

| | | | |
|---|---|---|---|
| 7,127,236 B2 | 10/2006 | Khan et al. | |
| 2003/0172090 A1 | 9/2003 | Asunmaa et al. | |
| 2004/0267663 A1 | 12/2004 | Karns et al. | |
| 2005/0187873 A1 | 8/2005 | Labrou et al. | |
| 2005/0199709 A1 | 9/2005 | Linlor | |
| 2005/0269402 A1 | 12/2005 | Spitzer et al. | |
| 2005/0273392 A1 | 12/2005 | Ahn | |
| 2006/0253392 A1 | 11/2006 | Davies | |
| 2007/0203788 A1* | 8/2007 | Andalib et al. ............ 705/14 |

OTHER PUBLICATIONS alphyra and ViVOtech Announce Strategic Alliance at Cartes 2006 Event in Paris; Business Wire Nov. 7, 2006.

Philips and ViVOtech to Deploy NFC-based Contactless Payment and Promotion Solutions; Business Wire Sep. 15, 2004.
Mastercard Chases Prepaid Accounts.(MasterCard International announced payment scheme that allows consumers to reload prepaid accounts using their MasterCard credit or debit card)(Brief Article); Cardline; vol. 3, No. 47 Nov. 21, 2003.
DM2 Licenses Smart Chip Technologies' Loyalty, Stored Value, and Gift Card Software; Business Wire Jan. 31, 2005.
Givex and MyThum combine talents to create the new Mx-Coupon program; PR Newswire Apr. 5, 2005.
The New Mio(TM) Money Prepaid MasterCard(R) and Mio(TM) Now Card Provide a Safe and Flexible Way to Pay; PR Newswire Sep. 27, 2005.
Executive Detail Corp.—Announces Name Change and New CUSIP Number; PR Newswire (Jan. 5, 2005).

(Continued)

*Primary Examiner* — Jeffrey A Smith
*Assistant Examiner* — Courtney Stopp
(74) *Attorney, Agent, or Firm* — Thomas Carulli (57) ABSTRACT

Disclosed herein are systems and methods for electronic gifting. In an exemplary gift purchasing method, a control system receives from a purchasing system a gift purchase request that includes a mobile telephone number (or other unique telephonic identifier) associated with a wireless gift recipient system, sends to a payment authorization system a payment authorization request, receives a payment authorization, and notifies the wireless gift recipient system of an electronic gift certificate. In an exemplary gift redemption method, the control system receives a gift redemption request for goods/services from a point-of-sale (POS) system, sends an authentication request addressed to the wireless gift recipient system by way of text message or other format, receives an authentication confirmation originating from the wireless gift recipient, and sends a redemption authorization to the vendor POS system. The control system has modules for conducting a targeted marketing campaign utilizing purchase and/or redemption information.

18 Claims, 7 Drawing Sheets

OTHER PUBLICATIONS

NBS Technologies Inc. Announces Payment Processing Certification with Global Payments 'TM'; Business Wire (May 6, 2004).

Catuity Strengthens Loyalty Patent Portfolio; European Patent Office Awards EMV-Focused Loyalty Patent; Business Wire in association with the European Patent Office Jun. 9, 2005.

Motorola Helps Subscribers Leave Their Wallets at Home; PR Newswire (Feb. 8, 2006).

"Cellfire", e.g., Press Release of Dec. 7, 2005, available at <www.cellfire.com>.

"Modiv Media" (f/k/a Mobile Lime), e.g., Press Release of Sep. 19, 2005, available at <www.modivmedia.com>.

"Go Mobo", e.g., Press Coverage of Sep. 20, 2006 by ABC News, available through <www.gomobo.com>.

"My Tango", e.g., Press Coverage of Apr. 27, 2006 by the Mobile Payments Café, available through <www.mytango.com>.

* cited by examiner

SYSTEMS AND METHODS FOR ELECTRONIC GIFTING

CROSS-REFERENCE TO RELATED APPLICATIONS

The present application claims the benefit of U.S. Provisional App. No. 60/880,772, filed Jan. 16, 2007, which is hereby incorporated by reference in its entirety for all purposes.

FIELD OF THE INVENTION

The present invention relates generally to systems and methods for electronic gifting. In particular, exemplary embodiments of the invention relate to systems and methods for authenticating a gift recipient.

BACKGROUND OF THE INVENTION

It is known in the art to use gift cards for an increasing variety of events in which gifts are normally exchanged and for an increasing variety of products and services. For the recipient of gift cards, keeping track of the cards and tracking the balance of the stored value associated therewith has been arduous. For the retailer, issues such as fraud and security management have inhibited the success of gift cards. Moreover, as gift card sales increase and more consumers become anonymous, retailers are losing the ability to target the marketing at their real customers, e.g., recipients of gift cards. This may hinder merchants who might otherwise benefit from the tendency of gift card recipients to spend more money in the store than that which was loaded on the gift card. Additional problem issues include unused gift cards and breakage of gift cards. Although it is known in the art to utilize electronic gifting to manage the stored value conventionally associated with tangible gift cards, fraud, security management, marketing, and other issues remain of concern. What is needed in the art are systems and methods for electronic gifting that overcome the disadvantages and shortcomings of the prior art.

SUMMARY OF THE INVENTION

The present invention overcomes the disadvantages and shortcomings of the prior art by providing a control system for the gifting of an electronic gift certificate. In an exemplary gift purchasing method of the present invention, a control system receives a gift purchase request from a purchaser, including a payment amount, payment information associated with the purchaser, the identity of a vendor, and a mobile telephone number (or other unique telephonic identifier) associated with a wireless gift recipient system, e.g., the cell phone of a gift recipient. The gift purchase request can include information, such as a purchaser name, and recipient information, such as a name of the gift recipient. The control system sends to a payment authorization system a payment authorization request, including the payment information, payment amount, and a service fee amount, and the control system receives a payment authorization from the payment authorization system and adds the payment amount to a gift account balance. The control system notifies the wireless gift recipient system of the electronic gift certificate, preferably by sending a text message addressed to the wireless gift recipient system.

In the exemplary gift redemption method of the present invention, the control system receives a gift redemption request from a point-of-sale (POS) system associated with the vendor of the gift purchase request, whereby the gift redemption request includes a redemption amount and the mobile telephone number (or other unique telephonic identifier) of the gift recipient. The control system identifies whether the gift account balance associated with the mobile telephone number has stored value exceeding that of the redemption amount, and, if so, sends an authentication request to the wireless carrier system that is addressed to the wireless gift recipient system. The authentication request is preferably in an electronic messaging format, such as the short-messaging-service (SMS) format, though it is contemplated that an interactive voice response (IVR) system can be used to implement authentication. If the control system receives from the wireless carrier system, for example, an authentication confirmation originating from the wireless gift recipient system, the control system sends a redemption authorization to the vendor POS system.

Additional features, functions and benefits of the disclosed systems and methods will be apparent from the detailed description which follows, particularly when read in conjunction with the accompanying figures corresponding thereto. For example, is shall be apparent that the present invention, in some embodiments thereof, can be provided as at least one computer readable medium collectively storing a program, which, when executed by a computer system, causes the computer system to perform a method.

BRIEF DESCRIPTION OF THE DRAWINGS

For a more complete understanding of the present invention, reference is made to the following detailed description of exemplary embodiment(s) considered in conjunction with the accompanying drawings, in which.

DETAILED DESCRIPTION OF THE EXEMPLARY EMBODIMENTS

Figure 1:
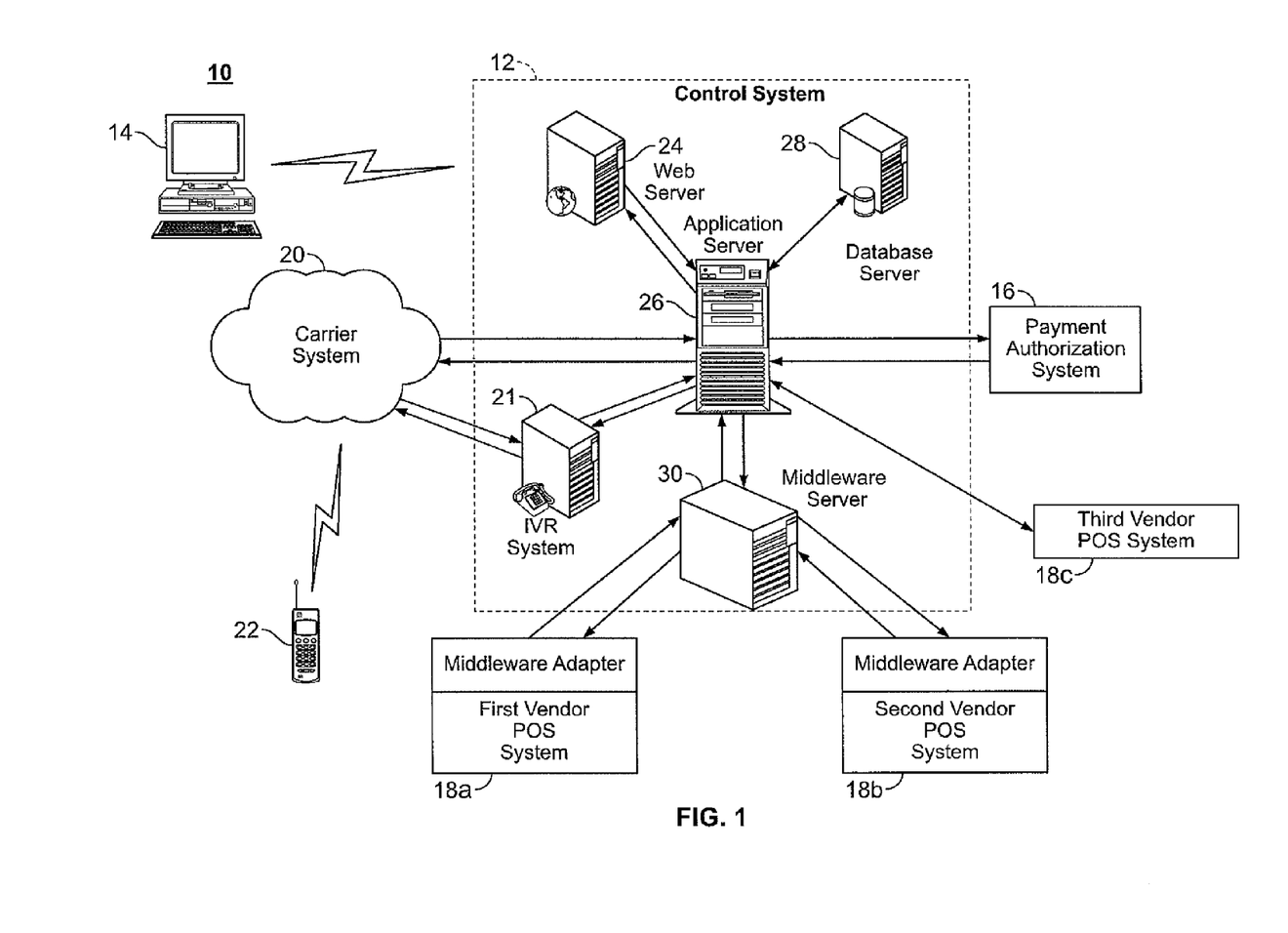
FIG. 1 is a network diagram showing a communications network that includes a purchasing system, a plurality of vendor point of sale (POS) systems, a payment authorization system, a wireless carrier system, a wireless gift recipient system, and a control system having a Web server, an application server, a database server, a middleware server, and an IVR system.

Referring to FIG. 1, a communications network 10 is shown to include a control system 12 constructed in accordance with an exemplary embodiment of the present invention. The communications network 10 further includes a purchasing system 14, a payment authorization system 16, a plurality of vendor point of sale (POS) systems 18a, 18b, 18c, a wireless carrier system 20, and a wireless gift recipient system 22. Each of the control system 12, the purchasing system 14, the payment authorization system 16, the vendor POS systems 18a, 18b, 18c, the wireless carrier system 20, and the wireless gift recipient system 22 shall be discussed below in detail.

The purchasing system 14 preferably includes a personal computer system in communication with the control system 12 via a wired and/or wireless network, such as the Internet. As will be discussed in further detail below, a consumer, e.g., a purchaser, who desires to purchase an electronic gift certificate, e.g., stored value, for a gift recipient can do so by interfacing with the purchasing system 14 to send a gift purchase request to the control system 12. The gift purchase request includes, for example, a mobile telephone number associated with the gift recipient, a gift payment amount, purchaser information, and payment information associated with the purchaser, e.g., a credit card number, etc. Though discussion is had herein of a "mobile telephone number," it shall be understood that the purchase request can include any unique telephonic identifier, such as a mobile telephone number, etc., suitable for identifying a wireless gift recipient system 22 or other device having telephonic capabilities.

The purchasing system 14 includes a network interface device, a permanent and/or temporary memory device, a display device, at least one user input device, and an electronic processing device. The purchasing system 14 preferably has resident thereon Microsoft Windows (and/or another operating system), a Web browser, such as Microsoft Internet Explorer, and other software suitable for implementing the methods described herein.

It is contemplated that the purchasing system 14 can include any device type for interfacing with the control system 12. For example, it is contemplated that the purchasing system 14 can include a portable communications device that communicates with the control system 12 via a protocol corresponding with the device, such as the wireless access protocol (WAP). It shall be clear to one skilled in the art that the communications network 10 preferably includes more than one purchasing system 14, and that the purchasing systems can have heterogeneous and/or homogeneous communication protocols.

It is also contemplated that the purchasing system 14 can be a kiosk positioned in a physical facility, such as a retail store and/or hospitality provider associated with one of the vendor POS systems 18a, 18b, 18c, etc. The purchasing system 14 can include a customer service computer workstation, such that the purchaser can call or otherwise communicate with a customer service operator, who will then input information into the purchasing system 14 for the gift purchase request.

Continuing with reference to FIG. 1, the control system 12 includes a Web server 24, an application server 26, a database server 28, and a middleware server 30. The servers 24, 26, 28, 30 each have at least one network interface device, temporary and/or permanent memory devices, an electronic processing device, and other hardware suitable for performing the methods discussed herein. Although it is contemplated that each of the servers 24, 26, 28, 30 includes a three gigahertz processor and two gigabytes of random access memory, the control system 12 is scalable, and the servers 24, 26, 28, 30 can have any hardware suitable for implementing the methods described herein. Moreover, any suitable number of servers can be utilized to implement the methods herein described. Each one of the servers 24, 26, 28, 30 preferably has the Microsoft Windows 2003 operating system and/or another suitable operating system resident thereon. Software modules are resident on the servers 24, 26, 28, 30 for enabling performance of the methods discussed herein, though it is contemplated that the servers 24, 26, 28, 30 can be hard-wired with suitable logic. In some embodiments of the invention, the control system 12 can include an IVR system 21, which is discussed with further detail below.

The database server 28 preferably utilizes structured query language (SQL). The database server 28 can be queried by the application server 26 and has a data store resident thereon that stores data and relationships therebetween. For example, the data store includes the payment amount, the payment information, the identity of the vendor, purchaser, and gift recipient associated with a purchase, the mobile telephone number associated with the wireless gift recipient system 22, the redemption amount, status of authorizations, status of authentications, etc. It is contemplated that the database server 28 can include a stored data map for mapping data elements between the control system 12 and the vendor POS systems 18a, 18b, 18c. For example, the data map can define data internal to the control system 12 to correspond with data acquired at one or more of the POS systems 18a, 18b, 18c, such as item SKU number, the price of such item, a description of such item, etc.

The Web server 24 is in communication with the purchasing system 14 and hosts a secure Web portal, whereby the purchaser can provide at least part of the gift purchase request. The portal is accessible over the Internet as a Web portal and/or over a mobile network, such as a WAP portal. The portal(s) are preferably database/template driven and appear with the identity of a vendor and/or merchant associated therewith. A uniform resource locator (URL) attribute determines that vendor which is to be displayed in connection with portal. In some embodiments of the invention, the Web server 24 and portal hosts web services that are provided by the vendor, such as by a vendor server (not shown) and Web site thereof. It is contemplated that the vendor, e.g., vendor server, can host an interface to the user and control the user's interaction with the vendor-driven Web portal. In some embodiments, the vendor's server can host the secure Web portal for the purchaser and would communicate with the Web Server, 24, using a set of XML based web services.

The application server 26 has resident thereon a credit card processing module in communication with the payment authorization system 16 for facilitating authentication of the payment information. In exemplary embodiments, the application server 26 is in communication with the database server 28 for storing, retrieving, and associating information. The application server 26 preferably incorporates a Microsoft .NET based application that provides the business logic for implementing the methods herein described. The application server is preferably in communication with the middleware server 30, e.g., a Microsoft BizTalk server, for managing communications between the application server 26 and heterogeneous vendor POS systems 18a, 18b. It is contemplated that the application server 26 can have one or more dedicated communications adapter(s) for communications with a vendor POS system, e.g., the third vendor POS system 18c of FIG. 1, without the aid of the middleware server 30. Thus, while a middleware server 30 is shown in FIG. 1, it shall be understand that the middleware server 30 is not required. Moreover, in embodiments of the invention that include the middleware server, it shall be understood that it is not required for the middleware server 30 to have Microsoft BizTalk resident thereon.

The application server 26 preferably has modules resident thereon for short message service (SMS) and/or multimedia messaging service (MMS) wireless messaging with the wireless carrier system 20. Also, it is contemplated that the application server 26 can include location adapter modules, which, in cooperation with the carrier system 20, utilize a global positioning system (GPS) to identify the location of the gift recipient (for example, to facilitate sending the gift recipient system 22 an electronic coupon for a store when the gift recipient system 22 is physically proximate to such store). The SMS, MMS, and location adapter modules are preferably distributed for resilience and to facilitate scalability. In some embodiments of the invention, it is contemplated that the application server 26 has modules resident thereon for communicating with the IVR system 21, which is discussed with further detail below.

The middleware server 30 preferably has Microsoft Biz-Talk resident thereon. The middleware server 30 is preferably the communication channel between the application server 26 and heterogeneous vendor POS systems 18a, 18b (and/or enterprise systems).

The application server 26 has point-of-sale (POS) communication modules stored thereon for communicating with the vendor POS system 18c via the dedicated adapter and with the vendor POS systems 18a, 18b via the middleware server 30. The application server 26 preferably includes a middleware adapter for communicating with the middleware server 30 using a version of Extensible Markup Language (XML) formatted for compatibility with the middleware server 30. It is contemplated that the POS communication modules can be distributed across a plurality of servers for scalability and resilience. The POS communications modules emulate a point-of-sale vendor system and provide at least a portion of the business logic for balance inquiries, credit card authorizations, receiving redemption requests, and sending redemption authorizations.

It is contemplated that the control system 12 can include an IVR system 21 for interfacing between the application server 26 and the carrier system 20 to implement authentication by IVR. Suitable IVR systems are known in the art and include, for example, a network interface device, a permanent and/or temporary memory device, an electronic processing device, etc. It is preferred that the IVR system 21 include a server with an application programming interface (API) resident thereon for secure communications with the application server 26 over the Internet and with the carrier system 20 over the Internet. The IVR system 21 is configured for communications with the wireless gift recipient system 22 via the carrier system 22. The IVR system 21 can have resident thereon publicly available IVR software, such as that offered under the general public license by "Asterisk" and/or commercially available IVR systems from manufacturers such as Nortel, Avaya, Genesis, and/or Cisco, for example.

It is contemplated that the IVR system 21 can be included as part of the wireless carrier system 20, the application server 26 itself, one of the vendor POS systems 18a, 18b, 18c, and/or as part of another system. As further discussed below, it is contemplated that a vendor can select IVR in addition to or as an alternative to text messaging, etc. as the vehicle for authentication, and the vendor may, for business reasons, be empowered by the entity operating the control system 12 to provide the specifications for the IVR system 21. For example, the application server 26 can be configured such that, to authenticate a gift purchaser, the application server 26 sends a message to the IVR system 21 addressed for the wireless gift recipient system 22 to establish a voice call, and the gift recipient is asked by an automated voice to authenticate and/or deny by pressing keys on the wireless gift recipient system.

Continuing with reference to FIG. 1, each of the vendor POS systems 18a, 18b preferably includes a middleware adapter, e.g., a BizTalk adapter, to facilitate communications with the middleware server 30, e.g., a BizTalk server. In this regard, the middleware server 30 and adapters therefor enable the control system 12 to communicate with heterogeneous vendor POS systems 18a, 18b, such as where the first vendor POS system 18a operates on a platform different from that of the second vendor POS system 18b. As shown in FIG. 1, it is contemplated that the application server 26 can have software resident thereon and/or hardware for direct communications with a vendor POS system, such as the vendor POS system 18c.

Suitable vendor POS systems are known in the art and can include a plurality of terminals on a network, where each terminal includes a network interface device, a permanent and/or temporary memory device, an electronic processing device, a display device, and at least one user input device, such as a keyboard, a scanner, a pin pad (a keypad configured to receive a personal identification number), a magnetic credit card swipe, etc. As will be discussed further below with reference to FIG. 3, the POS systems 18a, 18b, 18c are configured to have inputted therein a gift redemption request. The vendor POS systems 18a, 18b, 18c are also configured to receive a gift redemption authorization from the application server 26.

The payment authorization system 16 communicates with the application server 26, which sends the payment information and the payment amount to the payment authorization system 16. Suitable payment authorization systems are known in the art and can include, for example, a network interface device, a permanent and/or temporary memory device, and an electronic processing device. It is preferred that the payment authorization system 16 include a server with a API resident thereon for secure communications with the application server 26 over the Internet. In an exemplary embodiment of the invention, the payment authorization system is operated by a third party that manages credit cards, bank accounts, and/or other electronic accounts having stored value.

Continuing with reference to FIG. 1, the wireless carrier system 20 is preferably a mobile telephone wireless carrier system configured for telephone data communications, such as text messages, and includes an SMS network for communicating messages in the SMS and/or MMS format. Suitable wireless carrier systems are known in the art and include, for example, a network interface device, a permanent and/or temporary memory device, an electronic processing device, and wireless communications hardware, e.g., towers, etc. It is preferred that the wireless carrier system 20 include a server with an API resident thereon for secure communications with the application server 26 over the Internet. It is contemplated that the carrier system 20 is configured to utilize GPS and/or other location-based technology to identify the geographic location of a gift recipient system 22 and communicate such location via the API to the control system 12 for processing in accordance with methods for advertising, such as when the control system 12 sends a coupon to the gift recipient system 22, wherein the coupon corresponds to a vendor having a physical store to which the gift recipient system 22 is physically proximate to.

The wireless gift recipient system 22 is preferably a portable communications device, e.g., a cellular telephone, a personal digital assistant (PDA), etc. The components of the wireless gift recipient system 22, such as a cellular telephone, are well known in the art. It is preferable for the wireless gift recipient system 22 to include keys, a display, an electronic processor, and a graphical user interface (GUI) for displaying text and graphics and for facilitating input from the gift recipient. The wireless gift recipient system 22 is in communication with the wireless carrier system 20 and is preferably configured for telephone data communications, such as text messages, including those in the SMS format and/or MMS format. The wireless carrier system 20 and the wireless gift recipient system 22 can be configured to communicate in SMS, MMS, and/or any other suitable telephonic messaging format, e.g., a messaging service that is compatible at least with wireless cell phones. It is contemplated that the wireless gift recipient system 22 can include hardware suitable for identifying the geographic location of the wireless gift recipient system 22.

Figure 2:
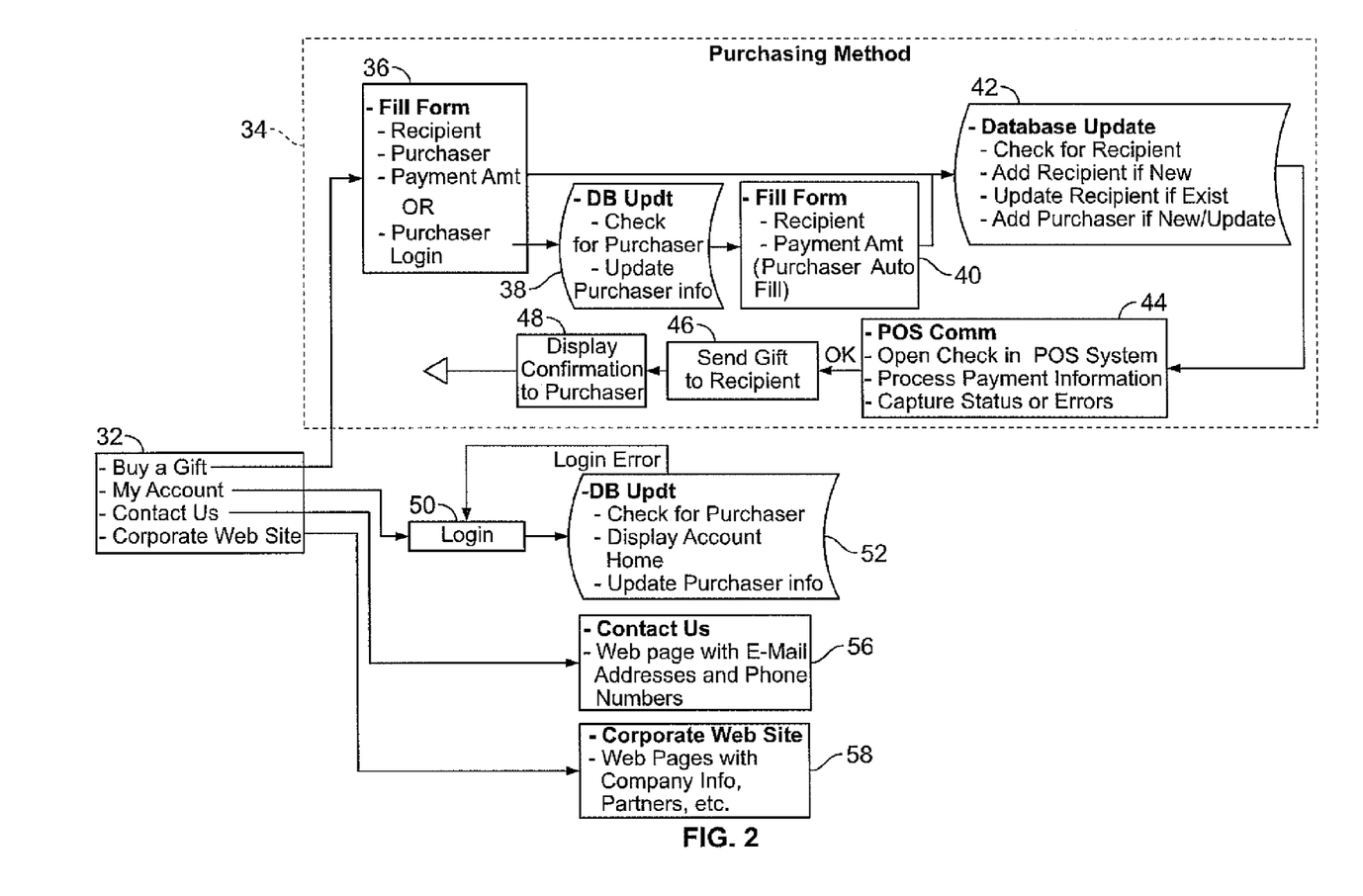
FIG. 2 is a flow chart showing a method for purchasing an electronic gift certificate.
Figure 3:
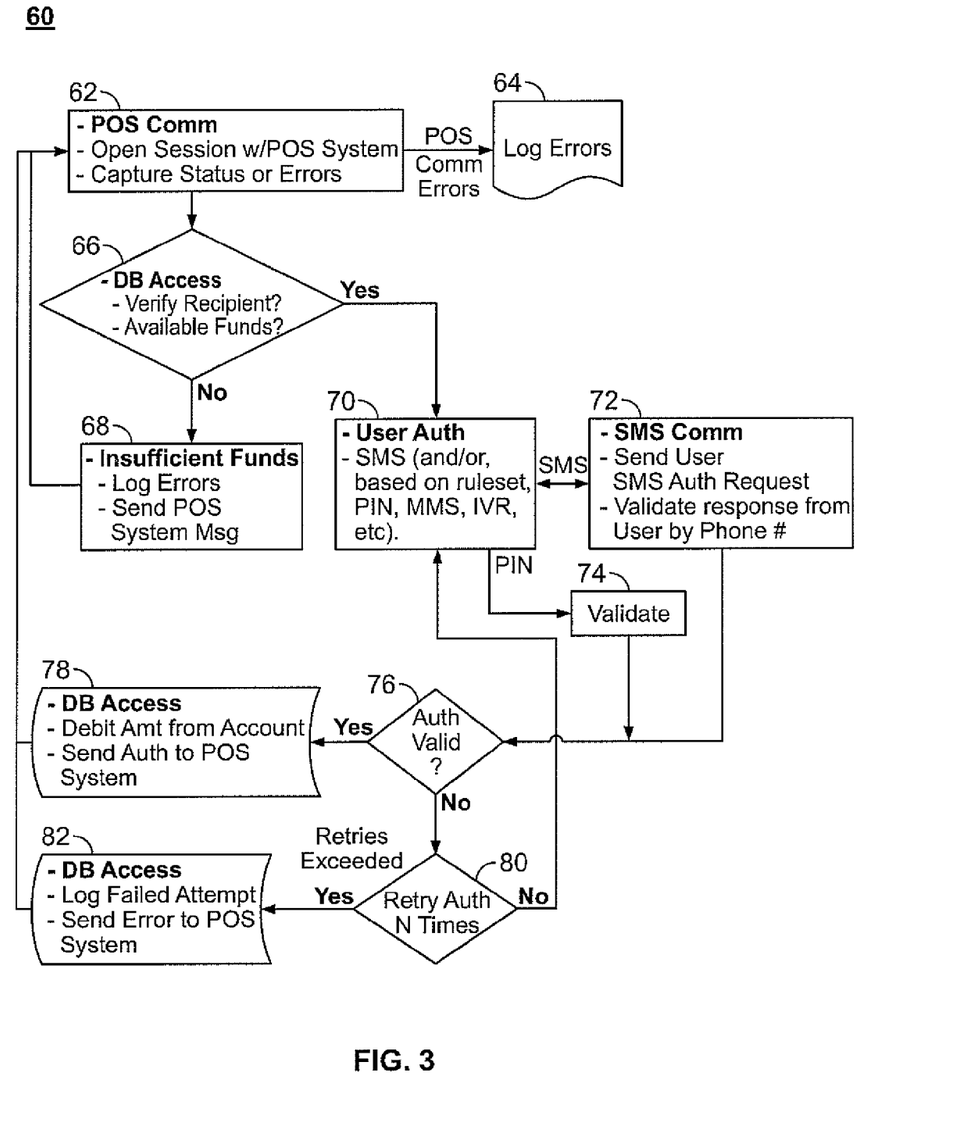
FIG. 3 is a flow chart showing a method for redeeming the electronic gift certificate of FIG. 2.

With reference to FIGS. 2 and 3, an exemplary purchasing method and an exemplary redemption method shall be described with further detail. Briefly, in the exemplary purchasing method, the control system 12 receives a gift purchase request from the purchasing system 14, sends a payment authorization request to the payment authorization system 16, receives a payment authorization from the payment authorization system 16, adds stored value to a new or existing gift account, and sends to the wireless carrier system 20 a text message addressed to the wireless gift recipient system 22. Briefly, in the exemplary redemption method, the control system 12 receives a gift redemption request from a corresponding one of the vendor POS systems 18a, 18b, 18c evaluates the gift account balance to confirm sufficient stored value, messages, for example, notice of the gift redemption request to the wireless gift recipient system 22 via the wireless carrier system 20, receives an authentication confirmation from the wireless gift recipient system 22 via the wireless carrier system 20, decrements stored value from the gift account balance, and sends a redemption authorization to corresponding one of the vendor POS systems 18a, 18b, 18c

Continuing with reference to FIG. 2, exemplary purchaser-side methods shall now be described with further detail. In step 32, the purchaser uses the purchasing system 14 to connect to a Web portal (or WAP portal) hosted by the Web server 24. The Web portal is driven by the template, vendor content, and other information stored in the database server 28. As indicated above, it is also contemplated that the vendor, e.g., a vendor server (not shown), hosts the web presence and communicates to the control system 12, e.g., the application server 26, via a set of web services hosted by the Web server 24 of the control system 12.

The application server 26 creates the Web portal from a template suitable for implementing the methods described herein, and an instance of the template can be populated for each vendor, such that the Web portal appears to the purchaser as being branded by the vendor and customized by the vendor. The control system 12 is scalable to perform the methods described herein for a plurality of heterogeneous vendors, e.g., a vendor that sells footwear, a vendor that sells musical equipment, etc. The vendor-specific Web portal is displayed dynamically based on the template and information stored in the database server 28. From such vendor-specific Web portal, electronic gift certificates can be purchased for that vendor, the balance of gift accounts associated therewith can be checked, parties can enroll in vendor specific loyalty programs, and the points/dollar balances associated with the loyalty programs can be reviewed.

The uniform resource locator (URL) of the Web portal includes a vendor identification portion. The Web portal utilizes dynamic linking, such that the vendor identification portion includes a reference pointer to the vendor content populating the corresponding instance of the template. In the event that the reference pointer to the vendor content is omitted from the URL, the purchaser will be directed to a generic Web page associated with the party operating the control system 12, wherein the purchaser can purchase electronic gift certificates for any of the vendors having an association with the control system 12.

In step 32, the purchaser is provided with the option of buying an electronic gift certificate associated with the vendor, viewing and/or modifying an existing account associated with the purchaser, contacting the party managing the control system 12, following a link to a corporate Web site associated with the party managing the control system 12, etc. If the purchaser selects the option to buy an electronic gift certificate, then the purchasing method 34 proceeds at step 36.

In step 36 of the purchasing method 34, the purchaser uses the purchasing system 14 to indicate whether the purchaser had previously set-up a purchaser account with the control system 12. If the purchaser had not previously created a purchaser account, the purchaser can input purchaser information such as the purchaser name, purchaser billing address, purchaser correspondence address, purchaser e-mail, etc. The purchaser provides information for the gift purchase request, which preferably includes the payment information (e.g., a purchaser credit card company, credit card number, security code, etc.), the name of the gift recipient, the gift payment amount, e.g., 100.00 U.S. Dollars, 10,000 Yen, etc. The gift purchase request preferably also includes the identity of the vendor associated therewith. The purchaser information and the gift purchase request are stored in the database server 28, the purchaser is provided with login information for future access, e.g., a user name and password, and the purchasing method 38 proceeds from step 36 to step 42.

In step 36, if there is already a purchaser account set-up with the control system 12, the purchaser inputs login information at the purchasing system 14 for communication to the Web server 24, and the purchasing method 34 proceeds to step 38. In step 38, the login information is provided to the application server 26, which queries the database server 28 to check for the purchaser, e.g., to authenticate the purchaser and retrieve the purchaser information. In step 38, the purchaser is provided with an opportunity to update the purchaser information. After purchaser authentication, the purchasing method 34 proceeds from step 38 to step 40, wherein the purchaser provides information for the gift purchase request, e.g., payment information, gift payment amount, name of the gift recipient, etc. The purchasing method 34 proceeds from step 40 to step 42.

In step 42, the application server 26 queries the database server 28 to identify if the gift recipient is new, and, if so, have the purchaser provide the mobile telephone number of the gift recipient for storage in the database server 28. If the mobile telephone number of the gift recipient had been provided in a previous transaction, the mobile telephone number is retrieved from the database server 28, and the purchaser is provided with the opportunity to update the mobile telephone number. It is contemplated that the purchaser can utilize the purchasing system 14 in step 42 to customize the text and images for the text message to be provided to the wireless gift recipient system 22. Updates to the purchaser information, payment information, etc. are stored in the database server 28 and the purchasing method 34 proceeds from step 42 to step 44.

In step 44, the application server 26 communicates with the payment authorization system 16 via an API to authenticate the purchaser and obtain payment authorization for the gift amount and one or more service fees charged by the entity (e.g., company) managing the control system 12. In some embodiments of the invention, in step 44, the application server 26 opens a check with a corresponding one of the vendor POS systems 18a, 18b, 18c, such that the corresponding one of the vendor POS system 18a, 18b, 18c can clear and authenticate payment using its payment authorization systems in place and maintain its own record of the gift purchase request.

If the payment authorization system 16 (or corresponding one of the vendor POS system 18a, 18b, 18c) does not authenticate the purchaser and/or does not authorize payment, the application server 26 receives one or more error message, which may be logged in the database server 28 and sent to the Web server 24 for communication to the purchasing system 14. If the payment authorization system 16 (or corresponding one of the vendor POS systems 18a, 18b, 18c) authenticates the purchaser and authorizes payment, the application server 26 receives such authentication and authorization and notes same in the database server 28.

The purchasing method 34 proceeds from step 44 to step 46, where the application server 26 sends notice of the electronic gift certificate to the gift recipient. Although it is contemplated that such notice can be provided by any suitable method known in the art, it is preferred that such notice be provided by way of a text message in the SMS format or another messaging format, e.g., MMS, etc. In the case of an SMS message, the SMS messaging adapter of the application server 26 sends such notice over the network via an API to the wireless carrier system 20 corresponding to the mobile telephone number. Such notice includes, for example, the gift amount, the identity of the vendor, the identity of the purchaser, and potentially an advertisement for the entity managing the control system, e.g., a corporate name, logo, etc. In the case of an SMS message, for example, such notice may be included in the body of the message, while the header of the message might include the mobile telephone number and/or a reference pointer associated with the mobile telephone number. The purchasing method 34 proceeds from step 46 to step 48, wherein confirmation of purchase is communicated to the purchasing system 14 via the Web server 24. In the exemplary embodiment, the purchaser is then directed to a Web site operated by the vendor associated with the gift purchase request.

In some exemplary embodiments of the present invention, the vendor secures redemption of the electronic gift certificate using a personal identification number (PIN). In such circumstances, the notice of the electronic gift certificate includes instructions to the gift recipient for creating a PIN with the vendor. It is contemplated that such PIN can be created using a text message, a secure WAP portal, a Web portal, calling a customer service center, etc.

Continuing with reference to FIG. 2, it is noted that exemplary embodiments provide the user with additional functionality at the Web portal. For example, in step 32, the user can click on a link entitled "My Account" to access the purchaser information stored on the database server 28. To do so, the purchaser provides login information in step 50, and, in step 52, the database server 28 is queried. In step 52, the purchaser can preferably also view and modify purchaser information. The purchaser can also view purchasing history, which may include a purchase of a first electronic gift certificate that is redeemable with the first vendor POS system 18a, a second gift certificate that is redeemable with the second vendor POS system 18b, etc.

As another example, in step 32, the purchaser clicks on a link, entitled "Contact Us." In this regard, the purchaser is presented with a Web page in step 56, with contact information for the entity managing the control system 12, such as its telephone number, e-mail address, and/or contact information for the specific vendor associated with the electronic gift certificate purchased. As yet another example, in step 32, the purchaser clicks on a link, and, in step 58, the purchaser is presented with a corporate Web site that is for the entity managing the control system and that includes corporate information, partnering information for vendors, etc.

Referring to FIG. 3, an exemplary gift redemption method 60 shall now be described with further detail. A gift recipient associated with the wireless gift recipient system 22 shops for goods and/or services in a physical store of the vendor associated with the gift purchase request, e.g., a physical store associated the first vendor POS system 18a. The recipient selects good/services for purchase and has information concerning same entered by a store clerk at the register into the corresponding vendor POS system 18a by suitable means known in the art, such as a scanner, a keyboard, etc. The gift recipient indicates to the store clerk that the gift recipient had previously received an electronic gift certificate, and provides the store clerk with the mobile telephone number associated with the wireless gift recipient system 22. The store clerk then opens a session between the first vendor POS system 18a and the control system 12 to provide the control system 12 with a gift redemption request that includes the mobile telephone number, the redemption amount, etc. In some embodiments of the invention, the gift recipient enters the mobile telephone number directly into the pin pad of a terminal on the vendor POS system 18a. In embodiments of the invention where the gift recipient had created a secure PIN with the vendor, the store clerk will collect the PIN from the gift recipient via the pin pad of the first vendor POS system 18a and include the secure PIN in the gift redemption request.

It is contemplated that the exemplary redemption method 60 discussed above can be used in connection with an e-commerce Web site of an online merchant. For example, a gift recipient can select goods/services to purchase from a Web site of the merchant by entering items into a virtual shopping cart. The gift recipient "checks out" by selecting a payment option corresponding to the control system 12. The Web site of the online merchant is hosted by a server, which communicates with the control system 12 over the Internet. In connection with the gift recipient's entry of information for the purchase, e.g., the redemption amount, the shipping address, etc., the gift recipient is prompted to enter the mobile telephone number of the wireless gift recipient system 22. In this regard, the mobile telephone number and redemption amount can be passed from the hosting server of the online merchant to the control system 12.

Continuing with reference to FIG. 3, in step 62 of the exemplary redemption method 60, the control system 12 receives the redemption request, which is associated with the vendor of the first vendor POS system 18a, and which includes the mobile telephone number, the redemption amount, etc. In the case of the vendor POS system 18a, the middleware server 30 receives the redemption request and, to any extent necessary, translates the redemption request into a protocol and/or language compatible with the application server 26. As indicated above, however, it is contemplated that the vendor POS system 18c can communicate with a dedicated POS adapter of the application server 26. The application server 26 checks for communications error, and, if errors are found, logs same in the database server 28 in step 64. If errors are not found and/or are reconciled, the redemption method 60 proceeds to step 66.

In step 66, the application server 26 queries the database server 28 with the mobile telephone number to confirm that the database server 28 has resident thereon a stored association between the mobile telephone number and a wireless gift recipient system 22. Also, the application server 26 queries the database server 28 to confirm whether the gift account associated with the mobile telephone number has stored value equal to or exceeding that of the redemption amount. If there are insufficient funds, e.g., the redemption amount exceeds the stored value, then, in step 68, the control system 12 logs an error, sends a redemption denial to the first vendor POS system 18a, and proceeds to step 62 to receive another potential redemption authorization request. If the redemption amount is equal to or less than the stored value, then the redemption method proceeds to step 70. In some embodiments of the invention, should the redemption amount exceed the stored value, it is contemplated that the redemption method would also proceed to step 70, enabling the gift recipient to apply the stored value as partial payment for the goods/services, such that the gift recipient can make payment to the vendor by other means, e.g., cash, credit card, etc, for the remaining payment balance for the goods/services.

In step 70, the control system 12 identifies whether the gift recipient is to be authenticated using the secure PIN, IVR, and/or using a text message, such as an SMS and/or MMS message. If it is identified that authentication is to be implemented by messaging, the redemption method proceeds to step 72 from step 70, which is further discussed below.

In step 70, if it is identified that authentication is to be implemented by the secure PIN, the redemption method proceeds to step 74 from step 70. In step 74, the application server 26 generates a PIN request to the vendor POS system 18a. The vendor POS system 18a in turn obtains user input of the PIN on the pin pad and sends same to the control system 12. The redemption method 60 proceeds from step 74 to step 76, which is discussed below after further discussion of step 72.

In step 70, if it is identified that authentication is to be implemented by IVR, the application server 26 generates a PIN request to the vendor POS system 18a. The vendor POS system 18a in turn obtains user input of the PIN on the pin pad and sends same to the control system 12. The application server 26 sends a message to the IVR system 21 to establish a voice call to the gift recipient's stored mobile phone number and prompt the gift recipient with a spoken message to depress a particular key on the wireless gift recipient system 22 to provide an authentication confirmation and/or authentication failure, e.g., to approve the transaction or depress a different key to deny the transaction. The redemption method 60 proceeds from step 70 to step 76, which is discussed below after further discussion of step 72.

In step 72, where it has been determined that authentication is to be implemented by messaging, the application server 26 generates an authentication request that is addressed to the wireless gift recipient system 22, preferably in an SMS format, MMS format, etc. The authentication request preferably includes a message header designating the mobile telephone number and a message body including content, such as the redemption amount, identifying indicia of the first vendor, and identifying indicia of the entity, e.g., company, owning the control system 12. The control system 12 sends the authentication request to the wireless carrier system 20, such as one operated by T-Mobile, AT&T, etc. More particularly, the wireless carrier system 20 has an API addressable over a network, such as the Internet, and the authorization request is passed to the API. It is contemplated that the control system 12 can be compatible with multiple wireless carrier systems.

The gift recipient receives the SMS/MMS message at the wireless gift recipient system 22, where the content of the message is shown in the display thereof. The gift recipient authenticates herself by replying to the SMS/MMS message with an authentication confirmation. In some embodiments, the gift recipient may select between an approval and a denial, whereby a reply including approval would constitute authentication confirmation and a reply including denial would constitute an authentication failure. The authentication confirmation and/or authentication failure is sent from the wireless gift recipient system 22 to the application server 26 via the wireless carrier system 20, and the redemption method 60 proceeds from step 72 to step 76.

In step 76, the application server 26 determines if it has received an authentication confirmation. If the application server 26 identifies an authentication confirmation, then the redemption method 60 proceeds from step 76 to step 78, wherein the stored value of the gift account is debited by the gift redemption amount. In step 78, the application server 26 sends a redemption authorization addressed for the first vendor POS system 18a to the middleware server 30 for communications with the first vendor POS system 18a. The store clerk, after receiving the redemption authorization at the first vendor POS system 18a, provides the good/services to the gift recipient.

If, in step 76, the application server 26 identifies an authentication failure, then the redemption method 60 proceeds to step 80, wherein the application server 26 identifies how many attempts at authentication have been attempted. If the number of attempts has not exceeded a predetermined number (N) of attempts, then the redemption method 60 proceeds from step 80 to step 70 discussed above. If the number of attempts has exceeded the predetermined number (N) of attempts, then the redemption method 60 proceeds from step 80 to step 82, wherein the application server 26 logs the authentication failure in the database server 28, sends an error to the first vendor POS system 18a, and returns to step 62.

Figure 4:
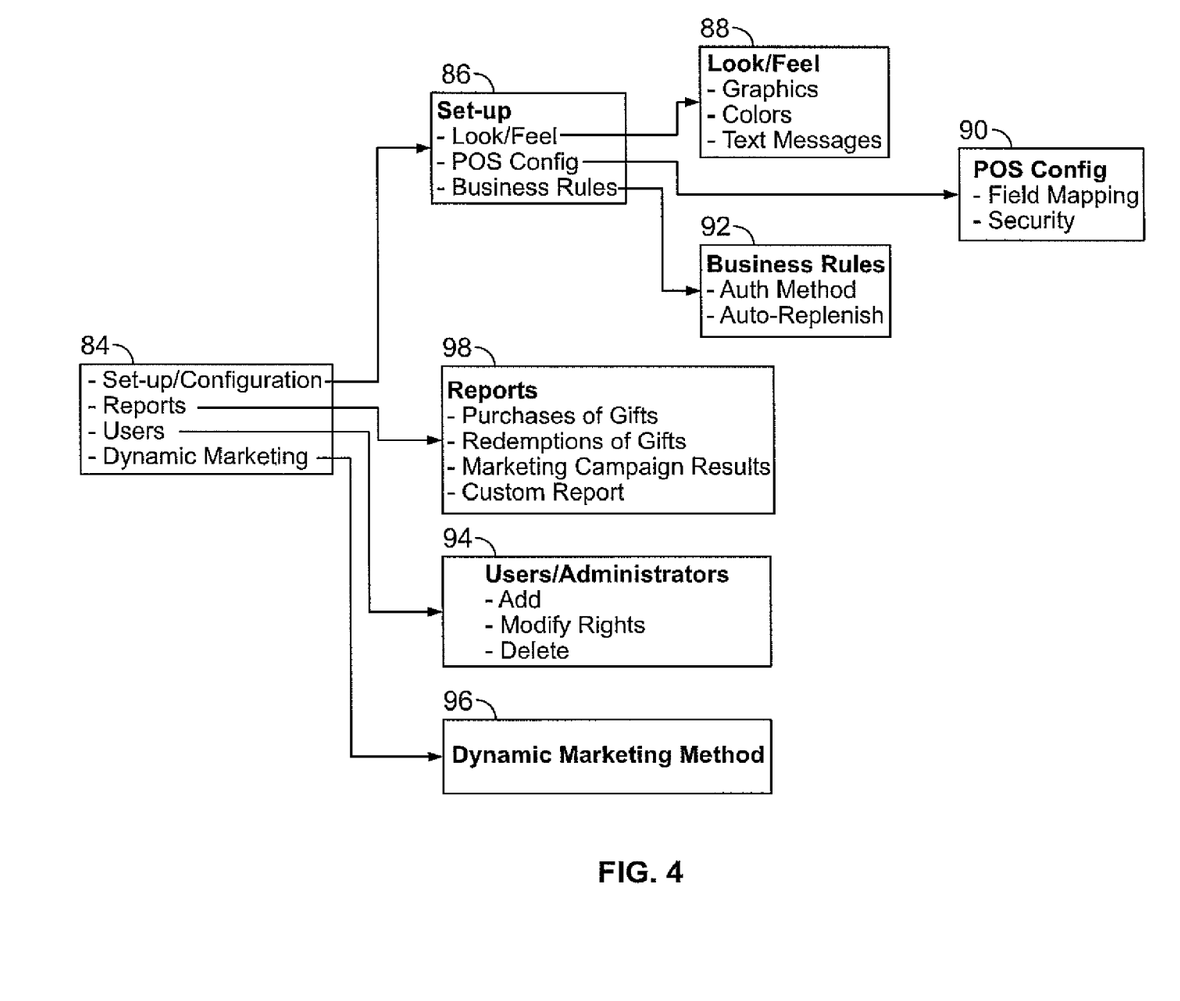
FIG. 4 is a flow chart showing a method for administering the control system of FIG. 1.

Referring to FIG. 4, a method of administering the control system 12 is shown. In step 84, a control system administrator can access an administrative area of the Web portal or another address to configure the control system 12, view and print reports concerning data gathered by the control system 12, control rights and security management of the control system 12, and administer a marketing method, which is discussed below with reference to FIG. 6.

Referring to step 84 of FIG. 4, the control system administrator selects to configure the control system, and the administration method proceeds to step 86. In step 86, the control system administrator can select to modify the look and feel of the Web portal. In such circumstances, the administration method proceeds to step 88, wherein the control system administrator can modify color, graphics, text, and other attributes of the Web portal template, vendor content therefor, and the SMS/MMS message to be displayed by the wireless gift recipient system 22.

If, in step 86, the control system administrator selects to configure attributes related to the POS system, such as field mapping and security, then the administration method proceeds to step 90, wherein such configuration can be implemented. In step 90, the control system administrator configures settings for communications with the vendor POS systems 18a, 18b, 18c. Such setting include, for example, whether the middleware server 30 or dedicated POS adapter of the application server 26 are to be used in connection with a particular one of the vendor POS systems 18a, 18b, 18c and any sub-address for the middleware server 30. Such settings further include security settings, if any, for secure communications with the vendor POS systems 18a, 18b, 18c and for field mapping and transposing data elements of the vendor POS systems 18a, 18b, 18c to corresponding data elements stored in the database server 28 (and vice versa).

If, in step 86, the control system administrator selects to configure the business logic of the control system 12, then the administration method proceeds to step 92, wherein such configuration can be implemented. In step 92, the control system administrator configures business rules specific to a vendor's business, including authentication method (e.g., PIN, IVR, text message, etc.), payment authorization method (e.g., from the application server, from the vendor POS system, etc.), and other vendor configuration specific attributes.

If, in step 84, the control system administrator selects to modify rights access to the control system, the administration method proceeds from step 84 to step 94. In step 94, the control system administrator can add administrators, delete administrators, and modify the existing rights of the existing administrators.

Figure 5:
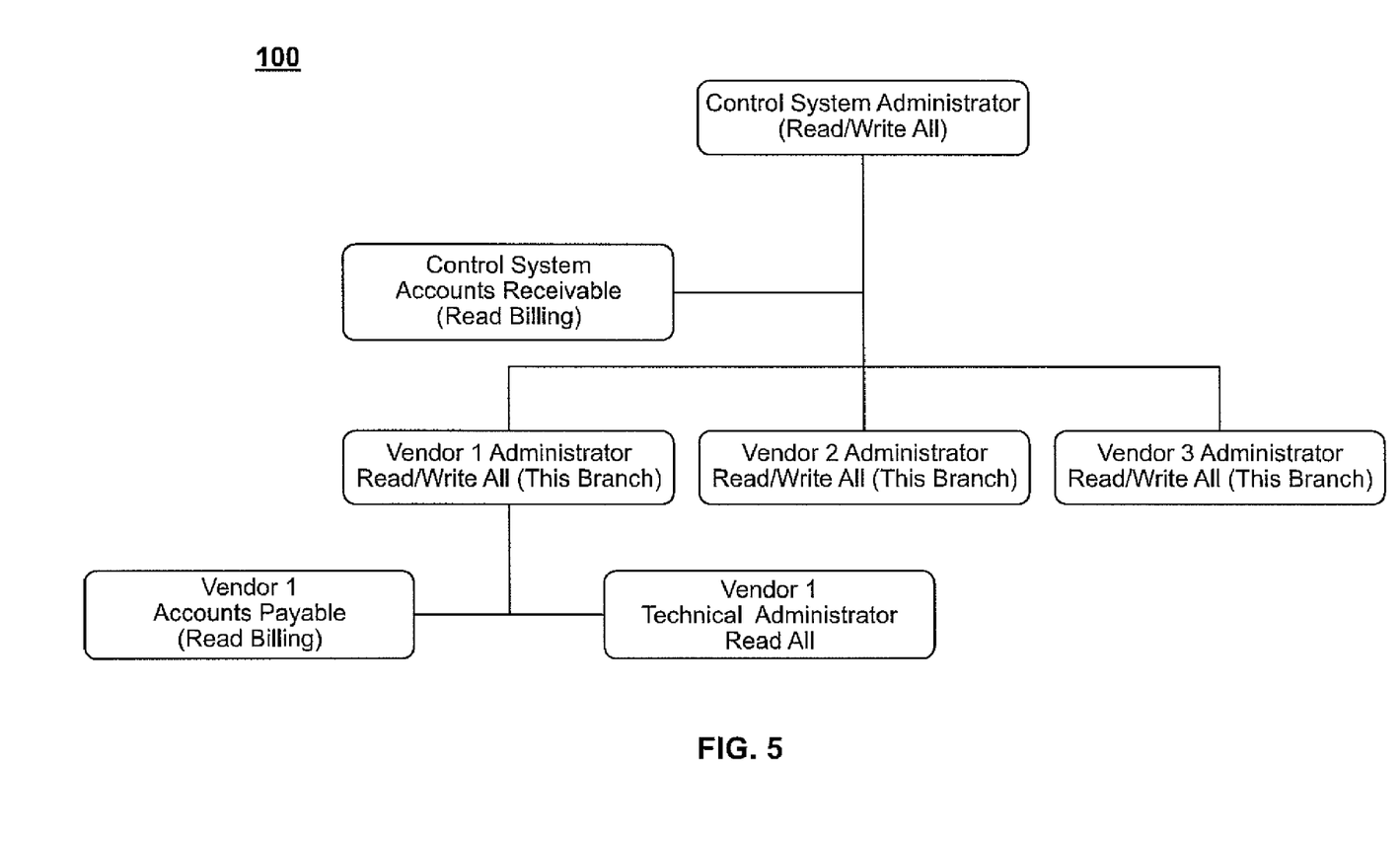
FIG. 5 is a diagram showing an inherency tree for administering rights for the control system of FIG. 1.

Referring to FIG. 5, an exemplary inherency tree is shown for administering rights for the control system 12. The control system administrator, having both read and write access to the control system 12, may grant certain read access to control system accounts receivable personnel for identifying billing information, such as the service fees authorized by the payment authorization system 16. As another example, the control system administrator can grant read/write access to an administrator for the first vendor, such that the vendor can modify the vendor content filling the template and read the accounts payable to the vendor. Similarly, rights can be granted to a second vendor administrator, a third vendor administrator, etc. The first vendor administrator, for example, can allocate the rights granted to the first vendor administrator to various personnel within the first vendor, such as first vendor accounts payable personnel and/or a low-level first vendor technical administrator.

Continuing with reference to FIG. 4, if, in step 84, the control system administrator selects to manage reporting features, the administration method proceeds to step 98. In step 98, the control system administrator views and prints customized reports, which are preferably statistical in nature. For example, for text messages, both the delivery and any response thereto had been recorded on a user-by-user basis, and the control system administrator can sort reports based on same. As another example, in the context of e-mail authentication, both an opened e-mail (using a hidden html call) and any response are recorded.

It is contemplated that the control system administrator can view and print reports showing attributes relating to, for example, the purchase of electronic gift certificates, the redemption of electronic gift certificates, etc. Custom reports can be generated. Reports can also be created based on the purchaser's name, the cell number thereof, purchase date, vendor, payment amount, recipient's name, the mobile telephone number thereof, redemption date, transaction type (in-store and/or online), transaction amount, sku number and price of items in a transaction/order, etc.

Also, it is contemplated that the control system administrator can view and print reports showing attributes relating to the marketing method 96 discussed below with reference to FIG. 6. The marketing method 96 is implemented when, in step 84 of FIG. 4, the control system administrator selects to do so.

Figure 6:
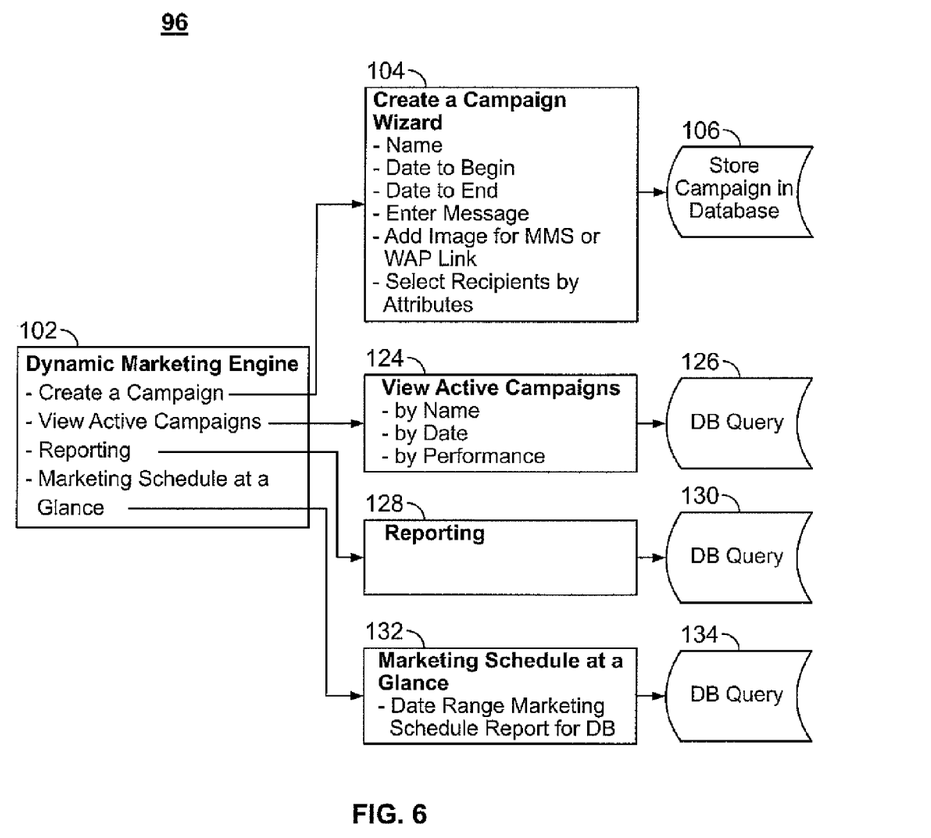
FIG. 6 is a flow chart showing a method for managing a marketing campaign that includes the sending of marketing content to the wireless gift recipient system of FIG. 1.

Referring to FIG. 6, the marketing method 96 enables the control system administrator to create marketing campaigns, view active marketing campaigns, delete campaigns, and view and print sorted reports concerning campaigns. In exemplary embodiments of the invention, a marketing campaign is targeted advertisement for selected purchasers and/or gift recipients, in which marketing content is communicated to the purchasers and/or gift recipients during a period of time.

For example, in step 102 of FIG. 6, the control system administrator chooses to create a new marketing campaign using a campaign "wizard," and the marketing method 96 proceeds to step 104. In step 104, the application server 26 receives inputs from the control system administrator that include the name of the marketing campaign, the marketing content (e.g., text, graphics, a WAP link, etc.), the mobile telephone numbers of those gift recipients to receive the marketing content, the begin date (or "drop date") of the marketing campaign, and the end date of the marketing campaign. It is contemplated that the mobile telephone numbers can be those selected from the database server 26 that satisfy selected attributes, e.g., all gift recipients associated with a vendor who sells shoes, all gift recipients associated with a certain geographic area, etc. After the marketing campaign has been created, the marketing method 96 proceeds to step 106, wherein the marketing campaign is stored in the database server 28. The marketing method 96 of FIG. 6 includes additional steps that shall be further discussed below.

Figure 7:
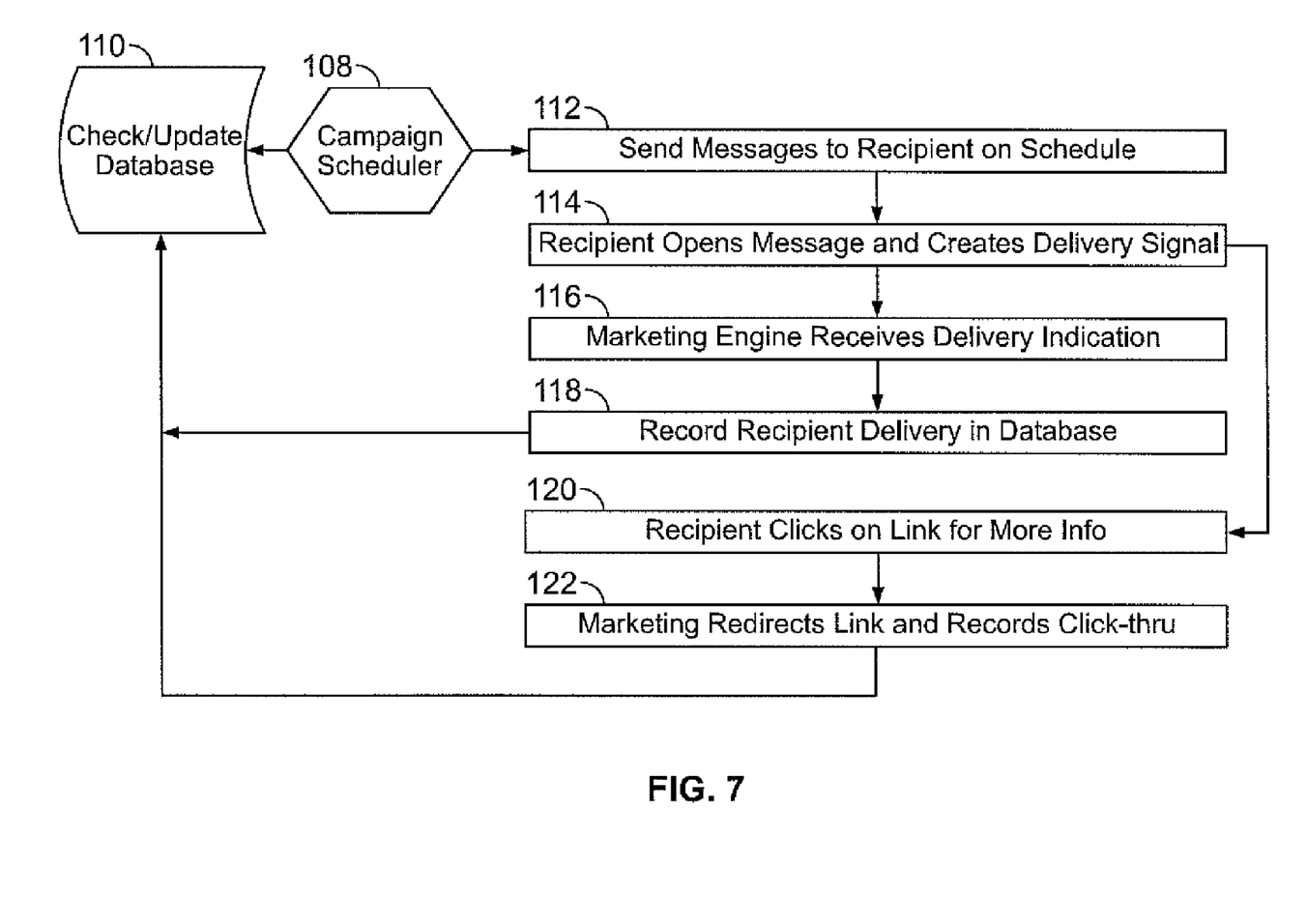
FIG. 7 is a flow chart showing a method for receiving a response to the marketing content of FIG. 6 from the wireless gift recipient system of FIG. 1.

Referring to FIG. 7, the application server 26 has stored thereon a listener, referenced herein a campaign scheduler 108, which, in step 110, continuously polls the database server 28 to identify when a marketing campaign is scheduled to start. When the begin date for a marketing date arrives, the campaign scheduler 108, in step 112, sends the marketing content of the marketing campaign to the gift recipient systems via SMS/MMS format and/or to the purchasing systems via e-mail.

The method proceeds from step 112 to step 114. In step 114, the messages are opened and a delivery-confirming signal is generated and received by the control system 12. In step 114, the user may be presented with the WAP link. From step 114, the method proceeds to step 116, wherein a marketing engine receives delivery indication, and, in step 118, the confirmation of delivery is stored in the database server 28. Also from step 114, the method proceeds to step 120, such that the user selectively follows the WAP link. The method proceeds from step 120 to step 122, wherein confirmation of the selection (e.g., click-thru) is sent to the control system 12 for storage in the database server 28, and wherein the user is redirected to a predetermined link. The campaign scheduler 108 preferably processes the information obtained from opened messages, message replies (e.g., click-thru's), and any unsubscribe requests.

Referring to FIG. 6, the control system administrator can, in step 102, select an option to view active marketing campaigns. The marketing method 96 proceeds from step 102 to step 124, wherein the control system administrator can initiate a database query 126 to view marketing campaigns by campaign name, by date (e.g., begin date, end date, etc.), and by performance (e.g., how many gift recipients "clicked-thru" on the WAP Link, how many of such gift recipients made a purchase as a result thereof, etc.).

In step 102, the control system administrator selects to manage reports, in which case the marketing method 96 proceeds from step 102 to step 128. In step 128, the control system administrator initiates a database query 130 to obtain stored information for printing and/or exporting reports concerning past, present, and/or future marketing campaigns. The reporting of step 128 preferably shares one or more modules with the reporting of step 98.

Also in step 102, the control system administrator can select an option to review a high-level report, entitled "Marketing Schedule at a Glance," in which the marketing method 96 proceeds to step 132 from step 102. In step 102, the control system administrator initiates a database query 134 to populate the high-level report. Viewing of the high-level report is subject to rights management, such that each vendor is preferably prevented from viewing the high-level report associated with another vendor.

In some embodiments of the present invention, a user of the wireless gift recipient system 22, e.g., mobile device, is enabled to redeem stored value, e.g., gift certificates, using the wireless gift recipient system 22, where the mobile telephone number, e.g., individual cell phone number, is used as a substantially unique identifier for virtual stored value accounts, such as virtual gift certificates, generic stored value accounts, branded debit accounts, and loyalty accounts. The wireless gift recipient system 22, e.g., cell phone, can be used to check balances for stored value gift certificates (virtual or real) and for redemption of the virtual stored value account at the store or on-line using the mobile device.

Regarding loyalty accounts, for example, it is contemplated that the systems and methods herein described can be used in connection with the redemption of stored value, such as points that are redeemable for goods/services. For example, it is contemplated that the vendor can associate value, such as vendor-points, with a recipient thereof by associating such points with the mobile telephone number of the wireless recipient system. In an exemplary points redemption method of the present invention, the control system 12 receives a points redemption request from a vendor POS system associated with the vendor, whereby the points redemption request includes a redemption amount and the mobile telephone number of the recipient. The control system 12 identifies whether the points balance associated with the mobile telephone number has stored value exceeding that of the redemption amount, and, if so, sends an authentication request to the wireless carrier system 20 that is addressed to a wireless recipient system, e.g., cell phone, of the recipient. The authentication request is preferably in an electronic messaging format, such as the SMS and/or MMS format, though it may be by way of another vehicle for authentication, e.g., PIN, IVR, etc. If the control system 12 receives from the wireless carrier system an authentication confirmation originating from the wireless recipient system, the control system 12 sends a redemption authorization to the vendor POS system.

It is contemplated that some embodiments of the invention can incorporate "re-gifting capabilities," such that the control system 12 provides the gift recipient with the ability to give the electronic gift certificate to another directly and/or through a virtual trading post. Moreover, the electronic gift certificate can be bought, sold, and/or swapped. It is contemplated that such re-gifting can be done by an auction and/or a "buy now" method.

It is also contemplated that virtual stored value "filling stations" can be provided by way of a kiosk, whereby a consumer can feed cash into the kiosk to add funds to the gift account. The kiosk provides means for moving cash into electronically available funds and enabling e-commerce without a credit card or bank account. For example, such means can be used by minors with cash from odd jobs, e.g., babysitting, cutting lawns, etc. and low-wage earners who are paid in cash, e.g., restaurant kitchen workers, waiters, laborers, etc.

It will be understood that the embodiments of the present invention described herein are merely exemplary and that a person skilled in the art may make many variations and modifications without departing from the spirit and the scope of the invention. All such variations and modifications, including those discussed above, are intended to be included within the scope of the invention as defined in the appended claims.

What is claimed is:

1. An electronic gifting method, comprising: receiving from a purchasing system a gift purchase request including a vendor identification and a unique telephonic identifier associated with a wireless gift recipient system of a gift recipient;
   determining, by a processor, if there is a preexisting stored gift account associated with the unique telephonic identifier, and, if not, establishing a stored gift account associated with the unique telephonic identifier;
   sending to a payment authorization system a payment authorization request corresponding to the gift purchase request;
   receiving a payment authorization corresponding to the payment authorization request, and crediting the stored gift account associated with the unique telephonic identifier with an amount equal to the payment authorization;
   receiving a redemption amount request from at least one of a Web portal associated with the vendor identification and a point of sale system associated with the vendor identification;
   sending an authentication request addressed to the unique telephonic identifier of wireless gift recipient system for the redemption amount;
   receiving an authentication confirmation corresponding to the authentication request; and
   sending a redemption authorization to the at least one of the Web portal and the point of sale system.

2. The method of claim 1, wherein said step of receiving the redemption amount comprises receiving the redemption amount from the point-of-sale system, and wherein said step of sending the redemption authorization comprises sending the redemption authorization to the point-of-sale system.

3. The method of claim 2, wherein said step of receiving from the purchasing system comprises receiving at a control system, wherein said step of sending the payment authorization comprises sending from the control system, wherein said step of determining and crediting comprises determining and crediting at the control system, wherein said step of receiving the redemption amount comprises receiving the redemption amount at the control system, wherein said step of sending an authentication request comprises sending from the control system, wherein said step of receiving the authentication confirmation comprises receiving the authentication confirmation at the control system, and wherein said step of sending the redemption authorization comprises sending from the control system.

4. The method of claim 3, wherein the control system is distributed.

5. The method of claim 1, wherein said step of sending the authentication request comprises sending the authentication request in a message format.

6. The method of claim 1, wherein said step of sending the authentication request comprises sending the authentication request in at least one of an SMS format and an MMS format.

7. The method of claim 1, wherein said step of sending the authentication request comprises sending the authentication request in an e-mail format.

8. The method of claim 1, wherein said step of sending the authentication request comprises sending the authentication request is an interactive voice response (IVR) format.

9. The method of claim 1, wherein the gift purchase request includes a gift payment amount, wherein the payment authorization request corresponds to the gift payment amount and a service fee, and wherein crediting the stored gift account comprises crediting the stored gift account with the payment amount.

10. The method of claim 1, wherein said step of receiving the authentication confirmation comprises receiving a reply from the wireless gift recipient system.

11. The method of claim 1, wherein said step of receiving the authentication confirmation comprises receiving a personal identification number (PIN) defined by the gift recipient from the at least one of the Web portal and the point of sale system.

12. The method of claim 1, further comprising receiving from an administrator a message format selection defining a format of the authentication request.

13. The method of claim 1, further comprising instantiating a targeted marketing campaign associated with the wireless gift recipient system and the vendor identification.

14. The method of claim 13, sending commercial information associated with the vendor identification and addressed to the wireless gift recipient system.

15. The method of claim 14, further comprising receiving a communication indicative that the wireless gift recipient system is proximate a store associated with the vendor identification, wherein said step of sending the commercial information comprises sending the commercial information in response to receiving the communication.

16. The method of claim 1, wherein the unique telephonic identifier includes a mobile telephone number.

17. At least one computer readable medium collectively storing a program which, when executed by a computer system, causes the computer system to perform a method comprising:

receiving from a purchasing system a gift purchase request including a vendor identification and a unique telephonic identifier associated with a wireless gift recipient system of a gift recipient;

sending to a payment authorization system a payment authorization request corresponding to the gift purchase request;

determining if there is a preexisting stored gift account associated with the unique telephonic identifier, and, if not, establishing a stored gift account associated with the unique telephonic identifier;

receiving a payment authorization corresponding to the payment authorization request, and crediting the stored gift account associated with the unique telephonic identifier with an amount equal to the payment authorization;

receiving a redemption amount request from at least one of a Web portal associated with the vendor identification and a point of sale system associated with the vendor identification;

sending an authentication request addressed to the unique telephonic identifier of wireless gift recipient system for the redemption amount;

receiving an authentication confirmation corresponding to the authentication request; and sending a redemption authorization to the at least one of the Web portal and the point of sale system.

18. A control system comprising the at least one computer readable medium of claim 17.

* * * * *